United States Patent [19]

McCartney

[11] 4,090,455
[45] May 23, 1978

[54] BOILER START-UP AIR HEATER

[75] Inventor: Michael Scott McCartney, Bloomfield, Conn.

[73] Assignee: Combustion Engineering, Inc., Windsor, Conn.

[21] Appl. No.: 784,017

[22] Filed: Apr. 4, 1977

[51] Int. Cl.² .................... F23K 1/04; F23K 3/02; F23L 15/02
[52] U.S. Cl. .................................. 110/232; 110/106; 110/302
[58] Field of Search ............... 110/106, 104 R, 101 R, 110/56

[56] References Cited

U.S. PATENT DOCUMENTS

| 2,230,799 | 2/1941 | Hobbs | 110/106 |
| 2,841,102 | 7/1958 | Marshall | 110/106 |
| 3,273,520 | 9/1966 | Hottenstine | 110/106 X |
| 3,274,961 | 9/1966 | Wiechard | 110/106 X |

Primary Examiner—Clarence R. Gordon
Attorney, Agent, or Firm—Wayne H. Lang

[57] ABSTRACT

A coal fired steam generating system including an auxiliary oil fired burner combined with an air heater. The air heater provides heated air that is adapted to heat and dry the coal for combustion, while hot products of combustion exhausting from the oil fired burner supply heat to a precipitator that raises its operating temperature to increase its collecting efficiency.

7 Claims, 2 Drawing Figures

BOILER START-UP AIR HEATER

BACKGROUND OF THE INVENTION

The present invention relates to coal burning apparatus for the generation of steam. It is basic to the operation of boiler-furnace apparatus using coal for the generation of steam that the coal be heated and dried before it is subjected to final combustion. It has also been determined that dust removal apparatus adapted to clean the exhaust gases downstream from the furnace operate more efficiently at high temperatures than when cold.

It is therefore customary to provide an auxiliary heating system for coal burning steam generating apparatus in which a high energy fuel such as gas or oil is used as a fuel to initially heat the entire system whereby combustion of coal may readily be initiated and operation of the various elements of the system may proceed at a high rate of efficiency. Accordingly, the entire system including the boiler, boiler water, ductwork, heating and pulverizing mills for the coal as well as dust collectors for the gas exhausting therefrom are heated until they reach a predetermined operating temperature.

Since such a system requires extensive amounts of high energy fuel as an auxiliary source of heat, it is accordingly expensive to operate. However, it is generally considered necessary to the operation of a coal fired unit since the combustion of pulverized coal with a high moisture content is not possible unless suitably dried.

SUMMARY OF THE INVENTION

This invention therefore provides a coal fired steam generating plant with an auxiliary oil fired burner wherein indirect heat therefrom is directed to mills that dry a quantity of coal for the steam generator. Simultaneously the exhaust gases from the burner are directed independently to a gas cleaning apparatus to raise the temperature of the gas cleaning apparatus through which the exhaust gases are being directed, thereby raising the collecting efficiency of said apparatus.

A minimum amount of auxiliary oil or gas is required to perform the above stated function because heat flow from the auxiliary burner is directed only to those specific areas where a maximum temperature rise is required to effect optimum operation.

BRIEF DESCRIPTION OF THE DRAWING

The method of operation of the system defined herein will become more apparent from the specification and the drawing in which.

DESCRIPTION OF THE PREFERRED EMBODIMENT

Figure 1:
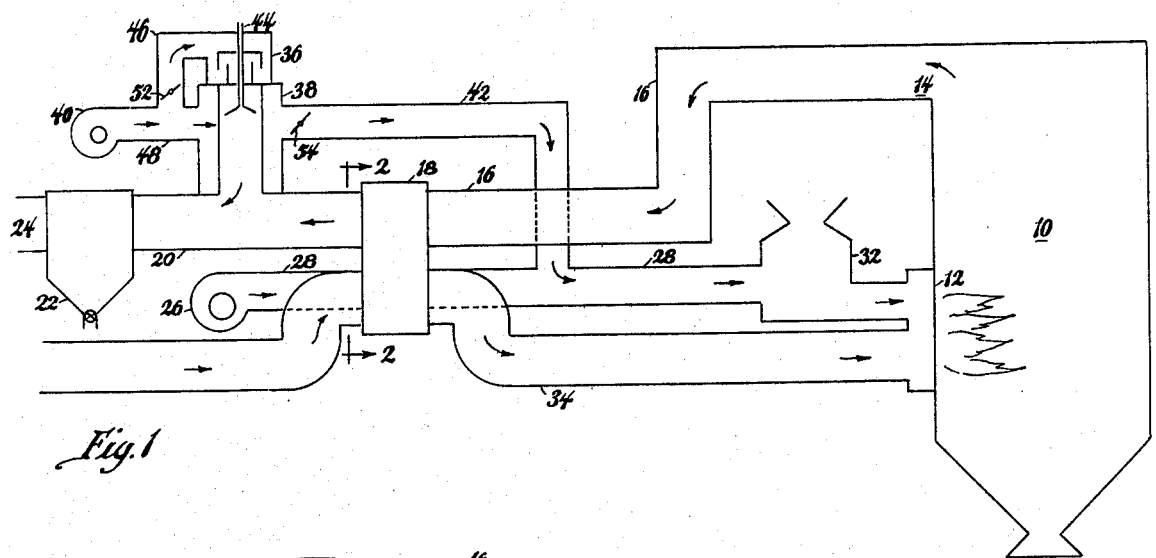
FIG. 1 is a schematic showing of a coal fired furnace system having an auxiliary oil fired start-up heater.
Figure 2:
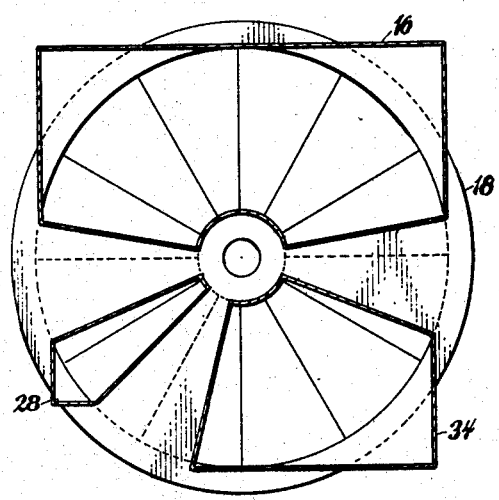
FIG. 2 is a schematic showing of a rotary regenerative heat exchanger as used in FIG. 1.

In the device of the invention a furnace 10 having a coal fired burner 12 exhausts hot oxygen deficient products of combustion through an outlet 14, an exhaust duct 16 and heat exchanger 18 to a dust collector 22 where particulate matter is removed therefrom before residual clean gas is exhausted through outlet 24 to the atmosphere.

Simultaneously oxygen bearing air for combustion is supplied by a fan 26 to a primary air duct 28 that passes through heat exchanger 18 in heat exchange relation with hot gas from furnace 10.

The primary air is heated in the heat exchanger 18 and continues to pass through primary air duct 28 to the pulverizing and drying mills 32 where a supply of coal is continuously heated and dried. The pulverized coal from the mill 32 is then carried by the primary air to the furnace 10 where it is exhausted through a burner 12 adjacent the exhaust of a secondary air stream that contains sufficient oxygen for the complete combustion of the pulverized coal. The secondary air is supplied through a duct 34 that traverses the heat exchanger 18 independently from the primary air in duct 28, but in heat exchange relation with the hot combustion gases of duct 16 so it is suitably heated before entry into the furnace 10.

In accordance with this invention an independent burner 36 for high energy fuel such as gas or oil is combined with a heat exchanger 38 whereby air from source 40 flowing through the heat exchanger and being indirectly heated by the burner 36 passes on through duct 42 and is exhausted into duct 28 in advance of the mill 32. By this arrangement, hot gases from the burner 36 transfer their heat to a quantity of air from source 40 traversing heat exchanger 38 whereby it comprises sufficient hot primary air to heat and dry the pulverized coal in mill 32 as required for efficient combustion of the coal.

The heat supplied to heat exchanger 38 is supplied by burner 36 that has an independent source 44 of high energy fuel such as oil or gas. Air for combustion of the fuel in burner 36 is supplied from source 40 through a duct 48 and a branch duct 46. After combustion in burner 36, the gaseous products of combustion being exhausted from burner 36 are low in oxygen content, high in heat content, and they contain some particulate matter from the combusting fuel, but they do contain a quantity of usable heat. Therefore, such products are exhausted into duct 20 directly in advance of dust collector 22 where the low oxygen content and the entrained particulate matter will not be detrimental, but where the heat content of the exhaust gases will effect a rise in temperature of the dust collector sufficient to increase its efficiency of operation.

The branch duct 46 is supplied with damper means 52 that controls the flow of air for combustion to the burner 36. Similarly, duct 42 includes dampers 54 that control the flow of hot air from the heat exchanger through duct 42 into duct 28. The dampers 52 and 54 are actuated by manual means (not shown), however it lies within the purview of this invention to actuate dampers 52 and 54 by a controller that is responsive to the temperature or other condition in mill 32.

I claim:

1. Coal burning apparatus including a furnace having an exhaust port for the exhaust of hot products of combustion therefrom, heat exchange apparatus, a hot gas duct traversing said heat exchange apparatus and terminating in the exhaust port of said furnace, a dust collector, a cooled gas duct connecting the dust collector to the exhaust duct to conduct cooled gas from the heat exchanger to the dust collector, a first source of primary air for combustion, a source of coal, a mill for drying and pulverizing coal, means directing coal from said source through the mill and to the furnace, a primary air duct conducting primary air from the source of primary air through the heat exchanger in heat exchange relation with the hot gas from the furnace and through the coal drying mills before it is exhausted into the furnace, an independent air heater comprising a heat exchanger that is heated by an independently fired burner, a second source of primary air, and an auxiliary duct means directing air from said second source through the independent air heater and into the primary air duct intermediate the coal drying and pulverizing mills and the heat exchange apparatus whereby said mills absorb heat from the independent air heater when the heat exchanger is cold.

2. Coal burning apparatus as defined in claim 1 wherein the burner has an independent source of high energy fuel.

3. Coal burning apparatus as defined in claim 2 including duct means supplying air to said burner, and means directing hot exhaust gas from the independently fired burner into the duct for cooled gas intermediate the heat exchange apparatus and the dust collector raising the temperature of gas passing therethrough before it is admitted to the dust collector.

4. Coal burning apparatus as defined in claim 3 including damper means in the duct supplying a quantity of air to said burner adapted to vary the gas exhausting into said dust collector.

5. Coal burning apparatus as defined in claim 4 including damper means in the duct that connects the air heater to the primary air duct adapted to vary the quantity of heated air from said air heater that may be supplied directly to the pulverizing and drying mill.

6. Coal burning apparatus as defined in claim 5 including a source of secondary air for combustion, and a secondary air duct conducting the secondary air through the heat exchanger in heat exchange relation with hot furnace gas before it is exhausted into said furnace.

7. Coal burning apparatus as defined in claim 6 wherein the secondary air is exhausted into said furnace adjacent the primary air and coal to provide effective combustion thereof.

* * * * *